UNITED STATES PATENT OFFICE.

WILLIAM S. WELCH, OF WESTFIELD, NEW JERSEY.

LUTING OR CEMENT.

SPECIFICATION forming part of Letters Patent No. 563,826, dated July 14, 1896.

Application filed January 31, 1895. Serial No. 536,877. (No specimens.)

*To all whom it may concern:*

Be it known that I, WILLIAM S. WELCH, a citizen of the United States, residing at Westfield, county of Union, State of New Jersey, have invented certain new and useful Improvements in Lutings or Cements and Process of Making Same, of which the following is a specification.

Ordinary cement or putty and other luting materials customarily employed are applied in plastic condition and become hard after application upon exposure to the air. In certain locations this hardening of the cement or putty is disadvantageous. The ordinary putty used for fastening the panes of glass in the frames of greenhouses and other structures exposing a large surface of glass soon hardens, becomes brittle, and as the wood shrinks away it parts from the wood or glass, or it cracks and leakages occur, cold air enters, and hot air escapes. The loosening of the panes thereby occasioned also results in the breaking of numerous panes of glass. Furthermore, the quick drying of the ordinary putty makes it necessary to remix and work it at times just before using.

My invention is a substance which can be used as a bond or luting like the ordinary putty or cement, and which shall not only be and remain sufficiently plastic before application, but shall, even when exposed to the air and applied to more or less porous supports, still retain its softness, elasticity, and tenacity, so that, for example, when applied to a greenhouse-sash the wood of the frame will not absorb the oils from the putty, nor will its shrinking cause it to loosen the putty but the latter will adhere tenaciously both to the wood and glass, even after prolonged exposure. I have, therefore, what may be described as a non-hardening, elastic luting, cement, or putty.

In preparing the cement or putty in accordance with my invention I first boil some suitable oil, preferably a drying-oil—such as linseed or palm oil—until it acquires a thick glutinous consistency. The time will vary from five to eight hours, according to the oil. It becomes thick and somewhat rubber-like in its adhesiveness. With this boiled oil I mix some suitable non-drying oil—such as cottonseed oil or lard-oil—in the proportions of thirty gallons of the former to forty gallons of the latter. When the oil is cooled, I preferably thin it for the next operation by adding a suitable proportion of an oil, such as naphtha or spirits of turpentine—say about thirty gallons of the latter to seventy gallons of the boiled and non-drying oils. The naphtha or spirits of turpentine are only used to facilitate the mixing and will evaporate during the course of the work. A suitable body is then added, preferably a powder such as whiting, white lead, barytes, or ocher in the proportion of one hundred pounds of whiting, &c., to twenty-five to fifty pounds of the mixed oil, varying according to the thickness and plasticity of the mass desired. The result is a plastic paste or putty which is non-drying, elastic, and tenacious. The boiled oil being incorporated thoroughly with the mass, renders it moisture-proof and forms a film over the surface which will prevent drying and hardening of the paste both by preventing evaporation and preventing absorption of the oil in the putty by any wood or other porous substance against which the putty is placed. I find that this paste can be used in any place subjected to extreme heat or moisture, as, for example, on the panes of greenhouse-frames, on chimneys, and in places where leaks are to be stopped. Instead of becoming hard and brittle, it remains soft and elastic for years, adhering to its place firmly. The wood or other substance to which it adheres may freely expand and contract without cracking or breaking the putty loose. The mass can also be easily removed and new glass replaced without breaking other glass, which invariably occurs in removing hard putty.

Having thus described my invention, the following is what I claim and desire to secure by Letters Patent:

1. A non-hardening luting, cement or putty containing an oil which has been boiled to a thick glutinous consistency.

2. A non-hardening luting, cement or putty consisting of an oil which has been boiled to a thick glutinous consistency, a non-drying oil and a suitable powder body in substantially the proportions stated.

3. The herein-described process of making non-hardening luting, cement or putty, which consists in boiling an oil from five to eight hours or until it assumes a thick glutinous or rubber-like consistency, mixing therewith a non-drying oil such as cotton-seed oil or lard-oil, and finally, thoroughly mixing a sufficient quantity of powder such as whiting, white lead or other similar substance to make the mass the desired thickness and plasticity, as set forth.

WILLIAM S. WELCH.

Witnesses:
M. V. BIDGOOD,
C. M. OTT.